United States Patent [19]

Fisher et al.

[11] 4,429,546
[45] Feb. 7, 1984

[54] HEAT TRANSFER IN GAS COMPRESSION

[76] Inventors: Charles B. Fisher, 2850 Hill Park Rd., Montreal, Quebec, Canada, H3H 1T1; Sidney T. Fisher, 53 Morrison Ave., Montreal, Quebec, Canada, H3R 1K3

[21] Appl. No.: 474,969

[22] Filed: Mar. 14, 1983

[51] Int. Cl.³ .............................................. F25B 27/02
[52] U.S. Cl. ..................................... 62/238.1; 48/190; 62/119
[58] Field of Search ................... 62/55, 238.1, 238.3, 62/238.6, 119; 165/104.21; 48/190

[56] References Cited

U.S. PATENT DOCUMENTS

| 2,350,348 | 6/1944 | Gaugler | 62/125 |
| 3,234,738 | 2/1966 | Cook | 62/238.6 |
| 4,292,814 | 10/1981 | Braun | 62/238.6 |
| 4,373,343 | 2/1983 | Asselman et al. | 62/238.6 |

Primary Examiner—Ronald C. Capossela

[57] ABSTRACT

In a gas compression system, heat rejected from the prime mover and the compressor is transferred from them to the loads driven by the compressed gas. This heat transfer reduces the energy required from the prime mover for delivery of a given amount of energy by the output load, and hence increases the efficiency of the gas compression system.

5 Claims, 2 Drawing Figures

HEAT TRANSFER IN GAS COMPRESSION

BACKGROUND OF THE INVENTION

A gas compression system in which heat rejected from the prime mover and the compressor is transferred to the gas driven output load.

In the prior art gas for transmission over a pipeline rises in temperature during compression and is then delivered. Substantial amounts of heat are rejected to the ambient from a heat engine driving the compressor, and are largely wasted. In the prior art gas for the operation of tools or other loads is compressed and stored, the heat energy due to the compression is rejected to the ambient, and the compressed gas is expanded in the tools or other loads, where the gas is reduced in temperature by expansion and discharged. When the gas compressor is driven by a heat engine, substantially all the heat rejected by the heat engine is wasted.

In this invention the heat rejected by the heat engine, when used is transferred to the point of expansion of the gas at the tools or other loads driven by the compressed gas, so that substantially no heat from the heat engine or the compressor is wasted. A heat pipe may be used for efficient transmission of heat.

SUMMARY OF THE INVENTION

When gas is compressed above the ambient pressure its temperature rises above the ambient temperature, and when the compressed gas is allowed to expand, its temperature falls. In this system of gas compression the heat rejected from the prime mover driving the compressor, and the compressor, is transferred by heat transfer means to the tools or other load driven by the compressed gas, and is used to raise the gas temperature, with a consequent saving of energy required by the prime mover for delivery of a given amount of energy by the load.

A heat pipe may be used in this system for the transfer of heat with high efficiency.

DETAILED DESCRIPTION OF ILLUSTRATED EMBODIMENTS

Figure 1:
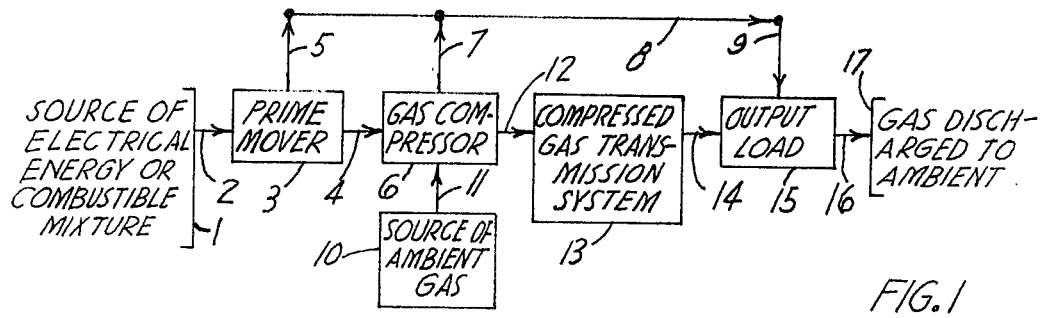
FIG. 1 shows in diagrammatic form a gas compression system delivering compressed gas at an elevated temperature.

FIG. 1 shows in diagrammatic form a gas compression system delivering compressed gas at an elevated temperature. This is useful for pumping stations on gas pipelines, and in gas compression systems where the compressed gas is allowed to cool in storage, as in systems used for inflating tires in automobile service stations.

In FIG. 1 a source of electrical energy or a combustible fuel combination, such as gasoline and air, designated 1, delivers energy over means 2 to a prime mover, which may be an electric motor or an internal combustion or other heat engine, designated prime mover 3. Prime mover 3 delivers energy over path 4 to gas compressor 6, which receives gas at ambient temperature and pressure over path 11 from source 10, and delivers compressed gas over path 12 to compressed gas transmission system 13. The output of system 13 is delivered over path 14 to output load 15, and gas at substantially an elevated temperature and pressure is delivered over path 16 to ambient 17.

Prime mover 3 and compressor 6 reject material amounts of heat, in the range of 30 to 80 percent of the energy of means 2. This energy flows over paths 5 and 7 to heat conductor 8, and from there over path 9 to output load 15. Items 5, 7, 8, and 9 may consist of the highly efficient structure known as a heat pipe, described in U.S. Pat. No. 2,350,348, issued in class 62-125 on June 6, 1944 to Gaugler.

Path 9 adds materially to the heat of the compressed gas, and therefore increases the system efficiency.

Figure 2:
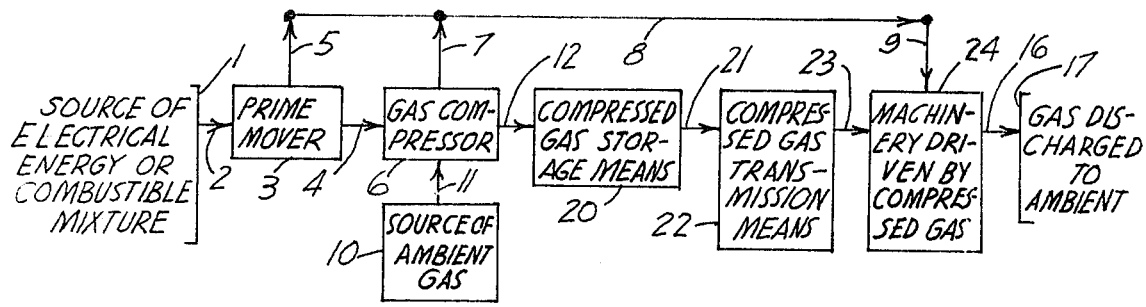
FIG. 2 shows in diagrammatic form a gas compression system according to the invention, delivering compressed gas to air machinery which exhausts said gas at substantially ambient temperature and pressure.

FIG. 2 shows in diagrammatic form a gas compression system according to the invention, which delivers gas at an elevated temperature to air machinery which expands and cools the gas, making use of the energy which is thereby obtained.

In FIG. 2 source 1 delivers energy over means 2 to a prime mover 3, which drives compressor 6 over path 4. Gas is supplied from source 10 over path 11, and compressed gas is delivered over path 12 to compressed gas storage means 20 and from means 20 over path 21 to gas transmission means 22. Means 22 is commonly a flexible thermally-insulated tube up to about 100 feet in length, extending from storage means 20 through connection 23 to machinery 24, which is driven by the compressed gas as it expands, reducing in temperature and pressure before being exhausted over path 16 to the ambient 17.

Prime mover 3 and compressor 6 reject material amounts of heat, in the range of 30 to 80 percent of means 2. This energy flows as heat over paths 5 and 7 to heat conductor 8, and from there over path 9 to machinery 24. Items 5, 7, 8 and 9 may consist of a heat pipe. Heat transmitted over path 9 adds materially to the energy of the compressed gas, enabling it to be expanded in machinery 24 and to be exhausted at about the ambient temperature and pressure. This condition is seen as the condition of maximum energy output of machinery 24, for a given delivery of energy on means 2.

As many changes could be made in the above construction, and many apparently widely different embodiments of this invention could be made without departing from the scope thereof, it is intended that all matter contained in the above description or shown in the accompanying drawings shall be interpreted as illustrative only and not limiting.

We claim:

1. A gas compression system which comprises a prime mover driving a gas compressor, and
storage means for said compressed gas, and
transmission means for said compressed gas from said storage means, and
an output load, which consists of apparatus driven by said compressed gas, and
heat transfer means, which transfers substantial amounts of heat rejected from said prime mover and said compressor to said gas at said output load.

2. A gas compression system according to claim 1, in which said machinery expands and delivers said gas at substantially ambient temperature and pressure.

3. A gas compression system according to claim 1, in which said prime mover is a heat engine.

4. A gas compression system according to claim 1, in which said prime mover is an electric motor.

5. A gas compression system according to claim 1, in which said heat transfer means includes a heat pipe.

* * * * *